EASY-OPENING CAN END WITH NONREMOVABLE TAB

Original Filed Oct. 13, 1967 3 Sheets-Sheet 1

INVENTOR:
Omar L. Brown

By Smyth, Roston & Pavitt
ATTORNEYS

EASY-OPENING CAN END WITH NONREMOVABLE TAB

Original Filed Oct. 13, 1967 3 Sheets-Sheet 2

INVENTOR:
Omar L. Brown

Smyth, Roston & Pavitt
ATTORNEYS

EASY-OPENING CAN END WITH NONREMOVABLE TAB

Original Filed Oct. 13, 1967 3 Sheets-Sheet 3

INVENTOR:
Omar L. Brown

By Smyth, Roston & Pavitt
ATTORNEYS

United States Patent Office

Re. 27,518
Reissued Oct. 31, 1972

27,518
EASY-OPENING CAN END WITH NONREMOVAL TAB

Omar L. Brown, Dayton, Ohio, assignor to Ermal C. Fraze, Dayton, Ohio

Original No. 3,446,389, dated May 27, 1969, Ser. No. 675,215, Oct. 13, 1967. Application for reissue Feb. 24, 1971, Ser. No. 118,580
Int. Cl. B65d *17/20*
U.S. Cl. 220—48 28 Claims

Matter enclosed in heavy brackets [ ] appears in the original patent but forms no part of this reissue specification; matter printed in italics indicates the additions made by reissue.

ABSTRACT OF THE DISCLOSURE

There is described herein an easy-opening container wall having a wall region formed by a rupturable score line and a bendable score line. A tab is secured to the container wall outside of the wall region and has a rupturing portion that overlies a portion of the wall region. Upon lifting the tab, the rupturing portion engages the wall region and forces the latter inwardly to thereby rupture the rupturable score line and cause the wall region to be bent inwardly into the interior of the container about the bend line.

BACKGROUND OF THE INVENTION

The usual easy-opening container has a tear strip formed in a container wall. A tab is secured directly to the tear strip and upon lifting of the tab, the tear strip is completely severed from the container wall to form an opening therein. The tab and tear strip are relatively small and are frequently carelessly discarded following their removal from the container. The container may also be discarded when empty; however, because the container is relatively large, it can be easily collected for disposal. On the other hand, the tabs and tear strips, being quite small, are often ignored or overlooked. Consequently, the small separated tabs and tear strips are found in ever-increasing numbers. The magnitude of this problem is increasing because the number of easy-opening containers is constantly increasing.

The litter created by the tear strips and tabs creates a particularly acute problem at recreational areas, such as parks and beaches, particularly because conventional devices for picking up beach litter do not pick up the tabs and tear strips. As a result, the separated tabs and tear strips continue to accumulate. For this reason, ordinances have been enacted in some areas to bar self-opening containers from the beaches.

In an attempt to meet this problem, it has been suggested to use a tear strip which is not completely severed from the container wall upon lifting of the tab which is secured thereto. The tear strip is, however, partially severable from the container to form an opening therein. To prevent complete severance of the tear strip from the container, the tear strip is permanently affixed along one edge thereof to the container wall. Upon lifting of the tab, the tear strip and tab are peeled upwardly and back over the rim of the container. This leaves the relatively sharp metal edges along the sides of the tear strip exposed, thereby subjecting the user to the danger of being cut thereby. This exposure of the tab and tear strip makes drinking a beverage directly from the container difficult. Furthermore, the tab and tear strip must remain in this peeled-back condition or the opening formed by the partial removal of the tear strip will be closed.

Another similar device uses an inwardly opening tear strip which is permanently affixed to the container wall and is not removable therefrom. A tab is connected to the tear strip so that as the tab is raised to the vertical position, the tear strip is pivoted inwardly into the interior of the container to form an opening therein. A primary disadvantage with this construction is that the tab must remain substantially perpendicular to the container wall if the container is to remain open and, therefore, it is impossible to consume a beverage directly from the can. The tab cannot be returned to its initial position without closing of the opening and, therefore, the tab must remain substantially in the path of the liquid that is poured therefrom. In some instances, this would interfere with the proper pouring of the liquid from the container and because the tab usually contains several crevices and corners which are very difficult to completely clean, the liquid, if it is a beverage, may become contaminated during the pouring thereof.

SUMMARY OF THE INVENTION

According to the present invention, all of the above-noted disadvantages are overcome. The present invention provides an easy-opening container wall in which a tab acts against a wall region of the container to urge the latter inwardly to form an opening in the container wall. As the wall region is pushed into the interior of the container, the relatively sharp edges thereof are not exposed to potentially injure the user. The tab can be returned to its initial position in which it is generally parallel to the container wall without closing of the opening in the container wall. Thus, with the present invention, an opening once formed in the container wall cannot be closed by subsequent movement of the tab and, therefore, the tab can be returned to its initial position and will not interfere with beverage consumption directly from the container or with pouring of the container contents. However, the tab and the wall region remain fixed to the container wall after the opening is formed in the container wall so that no litter is produced thereby.

The desirable results can be obtained, for example, by forming a rupturable score line in the container wall partially enclosing an area of the container wall and a bend line extending between spaced points on the rupturable score line. The area of the container wall enclosed by the rupturable score line and the bend line defines a wall region. A tab is secured to the container wall outside of the wall region. The tab has a rupturing portion overlying a portion of the wall region and adapted to engage the wall region.

As the tab is raised in the conventional manner, the rupturing portions bears against the wall region to rupture the rupturable score line and cause the wall region to bend inwardly into the interior of the container about the bend line, thereby forming an opening in the container wall. As the rupturing portion of the tab covers only a small portion of the wall region and because the tab is not secured to the wall region, the tab can be returned to its initial position without closing the open- ıg. The wall region remains permanently affixed to the ontainer wall at the bend line and once opened remains ithin the container. Similarly, the tab remains affixed ) the container wall and can be returned to its initial osition to permit drinking directly from the container nd to prevent interference with the stream of liquid ıat is poured from the container.

To assure that the tab can be returned to its original osition without closing the opening in the container all, the portion of the tab which overlies the wall region ıould not completely cover the wall segment. Preferably, ıe tab should overlie only an end portion of the wall gment. This can be accomplished without increasing ıe difficulty of initiating severance of the wall segment y using a wall segment that narrows as it extends longiıdinally and by requiring that the tab overlie the wide ıd of the wall segment.

Preferably the wall region comprises two inwardly bendıle wall segments. The wall segments may be formed, ır example, by three rupturable score lines extendıg generally radially of a point on the container wall and y two bend lines interconnecting the extremities of these ıpturable score lines. Various sizes, shapes, and numbers f wall segments can be used; however, triangular wall gments are preferred because they minimize the number f rupturable score lines which must be broken to open ıe can end and because they produce a triangular openıg of conventional appearance. Preferably, the rupturıg portion of the tab engages the wall segments at or osely adjacent the point of intersection of the three ıpturable score lines to thereby simultaneously stress l three rupturable score lines. The tab preferably exnds across two of the rupturable scores lines, but, in ıe embodiments illustrated, does not cross either of the end lines.

According to one form of the invention, the rupturing ortion of the tab includes a cam section for forcibly ımming the two wall segments inwardly as the tab is eing raised. To assure complete opening of the wall segıents and complete movement thereof to a position subantially perpendicular to the container wall, it is preerred that the camming section of the tab extend substanally the full distance between the two bend lines.

In the preferred form of the present invention, the tab cludes an attachment portion and a lever portion joined y a bendable hinge portion which defines a transversely ttending hinge line. The hinge line allows the tab to be voted relative to the attachment portion with a relavely small application of force. The lever portion of e tab has the lifting portion and the rupturing portion at pposite ends thereof.

When the lever portion of the tab is raised, the rupturg portion bears against the wall segments to apply force ereto. This force is resisted by the wall segments there- producing a reaction force which tends to lift or bend ıwardly the section of the container wall to which the tachment portion of the tab is connected. It is imporıt that this section of the can end not permanently dect upwardly substantially, for if it did, these rupturable ore lines would not be severed and the opener would il.

The present invention teaches that the tendency for the ction of the can end to which the tab is attached to nd upwardly is reduced substantially if the tab is atched to the container wall so that the hinge line lies bstantially along the rupturable score line or overlies e container wall outside of the wall segments and closely ljacent the rupturable score line. With the hinge line sposed in this manner the application of force to the ction of the container wall to which the tab is attached such that substantial permanent upward bending of said ction is extremely unlikely.

To further decrease the likelihood of such upward bendg, the present invention teaches securing the attachent portion of the tab to the container wall with two rivets integral with the container wall. The two rivets strengthen the can end adjacent the wall segments against bending. Futrhermore, attaching the tab to the container wall at two points prevents rotation of the tab about an axis perpendicular to the container wall and assures that substantially equal force will be applied to each of the wall segments.

In an easy-opening container of the type in which one or more wall segments of the container wall are to be bent inwardly into the container about a bend line, it is important that the tab apply the force to the wall segments in the most efficient manner. Furthermore, as the tab is connected to the container wall outside of the wall segments, it is important that the tab bear on the wall segments continuously throughout the pivotal movement of the tab to thereby assure that the wall segments will be cammed or pushed inwardly a sufficient amount to form the opening the container. The present invention accomplishes these functions by providing pressure pads on the lower face of the tab which extend downwardly toward the wall segments. Preferably, the lowermost portion of the pressure pads form the lowermost portions of the rupturing portion of the tab so that upon pivotal movement of the tab pressure pads forcibly bear on the wall segments closey adjacent the score line to thereby apply a substantially pure shearing force to the material of the can end along the score line. Preferably, the pressure pads are inclined so that after initial rupture of the score line occurs, the pads maintain engagement with the wall segments to pivot them inwardly about their respective bend lines. It is also preferred that the wall segments be engaged by the pressure pads at a point spaced substantially from their respective bend lines to increase the moment that is applied to the wall segments. Finally, the use of pressure pads allows the application of force to the wall segments to occur at a point or area which is nearer to the hinge line of the tab than the nose end surface. This increases the mechanical advantage of the tab over what it would be if the nose extremity or nose end surface of the tab were to contact the wall segments to initiate rupture thereof. This last-mentioned advantage is particularly significant because it is very difficult or impossible to construct a tab of sheet aluminum in which the nose extremity lies very close to the hinge line. This is because a substantial segment of aluminum must lie between the hinge line and nose extremity for strength purposes and such segment must be formed into a rib or bead thereby requiring additional space for tooling.

An easy-opening container wall, as described above, can be simply and economically formed in a three step operation. First, the bend lines, the several ribs which are provided ot take up the excess metal produced during the formation of the bend lines and the hollow rivet or rivets are simultaneously formed. Thus, the bend lines and the hollow rivet can be formed in a single punch and die set with one stroke of the punch. Secondly, the can end is scored to simultaneously form all of the rupturable score lines and finally the rivet is staked to secure the tab to the can end. If desired, the scoring step may be carried out first.

The invention, both as to its organization and method of operation, together with further features and advantages thereof may best be understood by reference to the following description taken in connection with the accompanying drawings.

DESCRIPTION OF THE PREFERRED EMBODIMENTS

Figure 1:
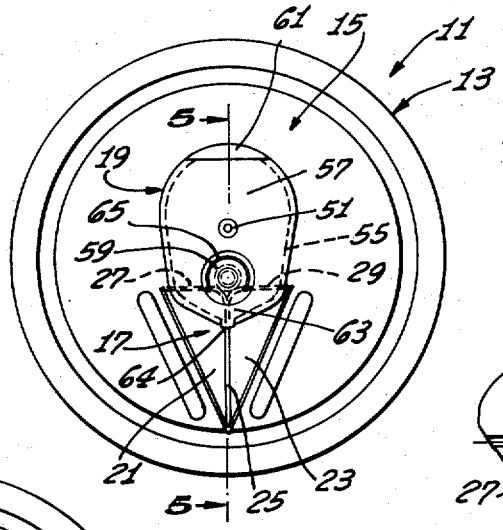
FIG. 1 is a top plan view of an easy-opening container wall constructed in accordance with the teachings of the present invention.

Referring to the drawings and in particular to FIG. 1 thereof, reference numeral 11 designates an easy-opening container wall or can end constructed in accordance with the teachings of this invention. The can end 11 has a peripheral flange 13 for use in attaching the can end to a container (not shown). The container wall 11 has a generally planar central portion 15 in which an inwardly bendable wall region 17 is formed. A tab 19 is secured to the container wall 11 closely adjacent, but outside of the wall region 17.

Figure 2:
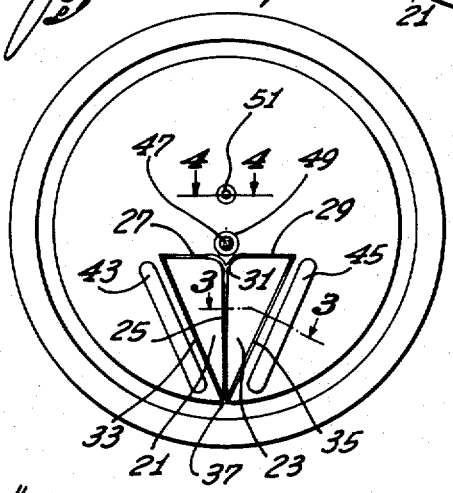
FIG. 2 is a top plan view of the container wall prior to the time that the tab is connected thereto.

Although the inwardly bendable wall region 17 may take many forms, in the embodiment illustrated, it comprises two inwardly bendable wall segments 21 and 23. As best seen in FIGS. 1 and 2, the wall segments 21 and 23 are defined by three lines of weakness or rupturable score lines 25, 27, and 29, which extend outwardly from a point of intersection 31, and by two hinge or bend lines 33 and 35 which interconnect the extremities of the three score lines. The bend lines 33 and 35 intersect to form an included angle which may be, for example, of the order of 50–60°. The score lines 27 and 29, notwithstanding the curved portions thereof adjacent the point 31, form in effect, the base of an isosceles triangle and the score line 25 forms the altitude of such triangle. Thus, each of the wall segments 21 and 23 form substantially a right triangle. As shown in FIG. 2 the wall segments 21 and 23 are of the same size and shape. The score line 25 intersects the bend lines 33 and 35 at an apex or point 37. The bend lines 33 and 35 may intersect or terminate just shortly of the score lines 25, 27, and 29.

Figure 3:
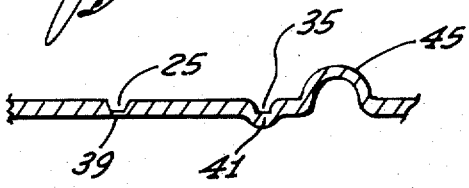
FIG. 3 is an enlarged fragmentary sectional view taken along line 3—3 of FIG. 2 and illustrating a score line, a bend line, and a rib adjacent the bend line.

The several rupturable score lines are formed by suitable scoring tooling which thin the sheet metal of the container wall 11 to a suitable amount to allow controlled rupture thereof. For example, as shown in FIG. 3 the sheet metal of the can end 11 may be thinned to about .003″ to .004″ to form a rupturable web 39. The bend lines 33 and 35 are formed by thinning the sheet metal of the can end an amount suitable to facilitate bending of such material along the bend line. As shown in FIG. 3, the sheet material of the can end along the bend line 35 may be thinned to form a bendable web 41 which may have a thickness of the order of .009″.

A substantial amount of metal is displaced outwardly from the bend lines 33 and 35 during the formation of the bendable web 41. To prevent this excess metal from causing "oil canning," a pair of ribs 43 and 45 are formed simultaneously with the formation of the bend lines 33 and 35, respectively. The ribs 43 and 45 preferably extend parallel to their respective adjacent bend line and may be U-shaped in cross section with the U opening downwardly as shown in FIG. 3. The use of the ribs 43 and 45 and the formation thereof is fully described in applicant's copending application Ser. No. 565,538.

An attachment rivet 47 is formed integrally with the container wall 11 closely adjacent the point 31 and aligned with the rupturable score line 25. Although the location of the rivet 47 may be varied, it is preferred to locate the rivet closely adjacent the wall segments 21 and 23. Although the rivet 47 may be formed in accordance with any one of several different methods, it is preferred to form the rivet by coining an annular region 49 surrounding the rivet 47. The coining operation thins the annular region 49 and causes the metal thereof to flow radially inwardly and upwardly to form the rivet 47. The forming of a hollow rivet in a single step coining operation is described fully in applicant's copending application Ser. No. 464,909.

Figure 4:
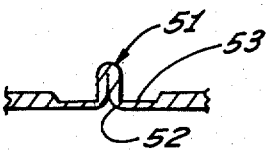
FIG. 4 is an enlarged fragmentary sectional view taken along line 4—4 of FIG. 2 and showing the bent rivet.

A vent rivet 51, which is preferably further from the wall segments 21 and 23 than is the rivet 49, is formed integrally in the container wall 11. The vent rivet has a weakened region 52 at the base thereof so that it can easily be pulled from the container wall to form a vent opening therein. The rivet 51 is also preferably formed in a one step coining operation by coining an annular region 53 (FIG. 4) and is preferably of very small outside diameter such as about 1/16″. Vent rivets of this type can be formed according to a known process and therefore is not described in detail herein.

Figure 5A:
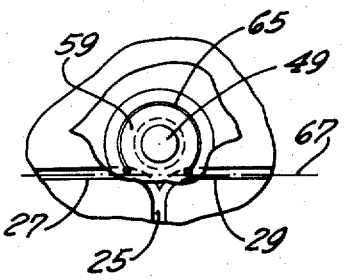
FIG. 5a is an enlarged fragmentary plan view of the attachment portion of the tab and the adjacent score line in the container wall.
Figure 5:
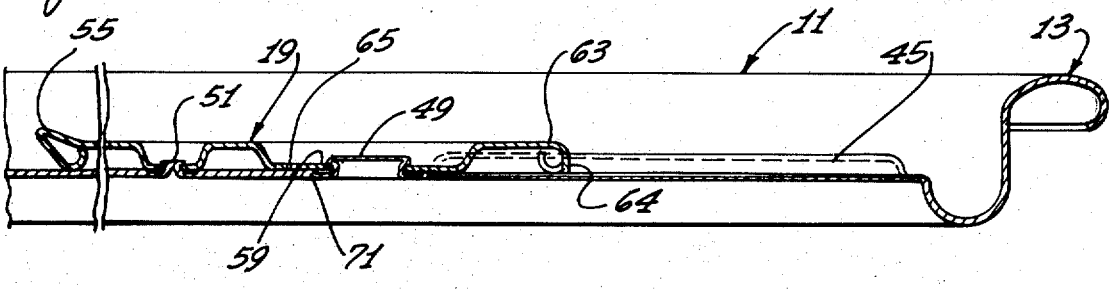
FIG. 5 is an enlarged fragmentary sectional view taken along line 5—5 of FIG. 1.

The tab 19 is placed over the rivets 49 and 51 and both of these rivets are staked to secure the tab to the container wall 11 to form the completed easy-open can end shown in FIG. 1. Although the tab 19 may take many forms, in the embodiment illustrated it is constructed entirely of sheet metal with a peripheral portion of the sheet metal being turned under to form a peripheral reinforcing bead 55 for stiffening the tab longitudinally. The bead 55 may contact the container wall 11 as shown in FIG. 5 and other portions of the tab may be elevated above the container wall as shown in FIG. 5.

The tab 19 is preferably not a ring tab and includes a longitudinally rigid lever portion 57 and an attachment portion 59 interconnected by a pliable portion of the sheet material which allows pivotal movement of the lever portion relative to the attachment portion. More particularly, the rearward end of the lever portion 57 forms a lifting end 61 and the opposite end portion of the lever portion forms a rupturing portion 63. The rupturing portion 63 has a depending rupturing finger 64 (FIG. 5) which is formed by interrupting the bead 55 at the nose end of the tab. The finger 64 overlies the score line 25 and materially assists in initiating rupture thereof. The sheet metal of the tab 19 is dished downwardly around the attachment portion 59 so that the attachment portion may engage the container wall as shown in FIG. 5. The attachment portion 59 is separated from the lever portion 57 by a cut 65 which is generally in the form of an inverted U as shown in FIGS. 1 and 5a. The sheet metal intermediate the ends of the cut 65 interconnects the attachment portion 59 and the lever portion 57. This sheet metal defines a transversely extending inge line 67 (FIG. 5a) which allows pivotal movement f the lever portion 57 relative to the attachment por-on 59.

With the tab 19 mounted on the can end 11 as shown ı FIG. 1, the tab overhangs the score lines 27 and 29 nd the rupturing portion 63 overhangs the wide end ortions of the wall segments 21 and 23. In the embodi-ıent illustrated the longitudinal axis of the tab 19 is ligned with the score line 25 and substantial portions of ıe wall segments 21 and 23 are not covered by the tab 9 although the tab extends substantially the complete istance between the bend lines 33 and 35, as shown in IG. 1.

As shown in FIG. 5a, the hinge line 67 lies substantially ıng the score lines 27 and 29. It has been found that y positioning the hinge line 67 substantially along the :ore lines 27 and 29 or generally parallel to the score nes outside of the wall segments 21 and 23, that the ɜndency of the section of the container wall 11 to which ıe tab 19 is attached to bend or lift upwardly is sub-:antially reduced.

In using this form of the invention, the user lifts up-ɜardly on the lifting end 61 of the tab 19 to thereby ivot the lever portion 57 about the hinge line 67 and ause the rupturing portion 63, and in particular the nger 64 to bear on both of the wall segments 21 and 23 ɔ apply an inward force thereagainst. Such pivoting ıovement of the tab 19 also exerts an upward tensile ɔrce on the relatively weak vent rivet 51. The tendency f the tab 19 to pivot is resisted by the rupturable webs 9 beneath the rupturable score lines and this causes the ıb 19 to apply an upward lifting force to a section 71 FIG. 5) of the can end to which the rivet 19 is at-ıched. The section 71 does not deflect upwardly or per-ıanently deform upwardly and substantial amount be-ause of the orientation of the hinge line 67 relative to ıe score lines 27 and because of the presence of the ivet 49 which acts to stiffen the section 71.

When sufficient force is supplied to the rivet 51 and efore the score lines 25, 27, or 29 rupture, the vent ivet 51 fractures and is pulled from the container wall 1 to form a small vent opening therein to equalize the ressure on both sides of the container wall 11. When he tab 19 is raised still further, the rupturable webs 9 fracture to allow the rupturing portion 63 to bend he wall segments 21 and 23 inwardly about their respec-ive bend lines. As the tab 19 is raised still further, the ontour of the rupturing portion 63 acts to cam the wall egments 21 and 23 inwardly a greater amount to form . large generally triangular pouring opening in the con-ainer wall 11. It should be noted that the tab 19 might hen be pivoted back to the original position thereof hown in FIG. 1 in which the tab is generaly parallel to he container wall without closing of the pouring open-ng. Thus, it is possible to drink directly from the con-ainer and the tab 19 does not interfere with the pour-ng of the contents of the container through the pour-ng opening. The edges of the pouring opening formed by he bend lines 33 and 35 are smooth, and the wall seg-nents 21 and 23 and the tab 19 remain permanently af-ixed to the container wall 11.

Figure 6:
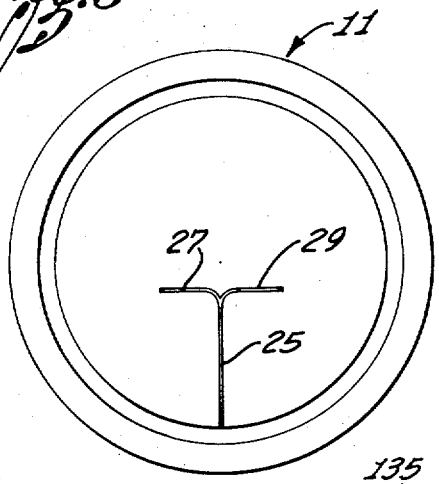
FIG. 6 is a top plan view of the container wall after a first work operation has been performed thereon.
Figure 7:
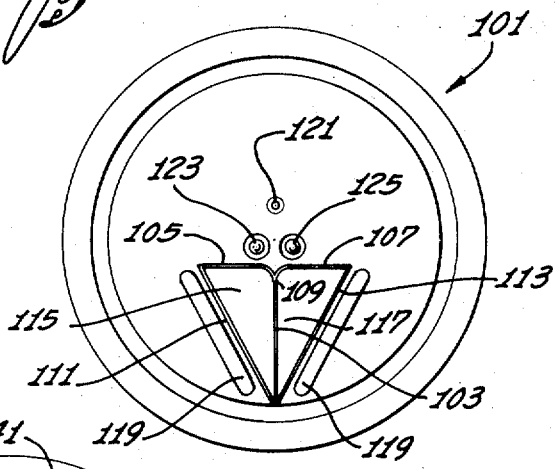
FIG. 7 is a top plan view similar to FIG. 2 illustrating a second embodiment of the present invention.

Another advantage of the present invention is that the ɜall segments 21 and 23 and the rivets 49 and 51 may ɜ simply formed in a two step operation. The first of hese steps, which is illustrated in FIG. 6, involves scor-ıg of the container wall 11 to simultaneously form the upturable score line 25, 27, and 29. The scoring op-ration may be carried out with one stroke of a single coring tool.

In the second step, the bend lines 33 and 35, the ribs 3 and 45 and the rivets 49 and 51 are formed simul-aneously with one stroke of an appropriate tool. Thus, ollowing the second work operation, the container wall 1 appears as shown in FIG. 2. If desired, the steps can ıe reversed so that the rupturable score lines are formed in the second work operation. Next, the tab 19, which has been preformed, is placed over the rivets 49 and 51 as shown in FIGS. 1 and 5 and the rivets are staked to secure the tab to the container wall 11. A similar method can be used in constructing the embodiments of the invention which are described hereinbelow.

The vent rivet in addition to forming the vent opening in the container wall also serves to prevent pivotal movement of the tab 19 about an axis generally perpendicular to the container wall 11 to thereby assure that the tab will be positioned to most effectively apply a rupturing force to the rupturable score lines.

FIGS. 7–11 show a second form of the present invention. In this form of the invention, a can end or container wall 101 has three rupturable score lines 103, 105, and 107 which intersect at a point of intersection 109 and two bend lines 111 and 113 which interconnect the extremities of the rupture score lines. These score lines and bend lines define wall segments 115 and 117 which are identical to the wall segments 21 and 23 of the first described embodiments. The can end 101 also that ribs 119 formed therein and a vent rivet 121.

The only difference between the container wall 101 and the container wall 11 is that the former has a pair of attachment rivets 123 and 125 formed therein. The rivets 123 and 125 preferably lie closely adjacent the score lines 105 and 107 and are positioned on either side of the rupturable score line 103. The can end 101 may be formed according to the simple two step method described above in connection with FIGS. 1–5.

A tab 127 (FIGS. 8–11) is secured to the container wall 11 by the rivets 123 and 125. The tab 127 is similar to the tab 19 in that a peripheral segment of the sheet metal is turned inwardly to form a peripheral reinforcing bead 129 which preferably extends completely around the tab. Further, the tab 127 has a longitudinally rigid lever portion 131 and an attachment portion 133 interconnected along a hinge line by a pliable region of the sheet material of the tab. The lever portion 131 has a lifting end 135 and a rupturing portion 137. The lever portion 131 may be formed with longitudinally extending reinforcing ribs 139 and dimples 141.

Figure 8:
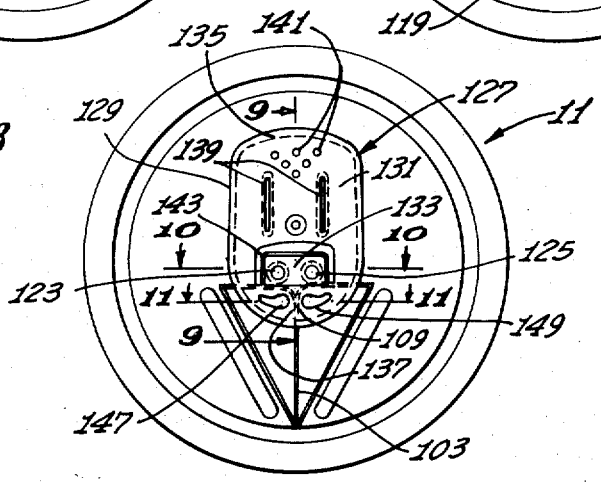
FIG. 8 is a top plan view similar to FIG. 1 illustrating the second embodiment of the invention.

The sheet metal of the tab 127 is dished down around the attachment portion 133 and the attachment portion has apertures therein through which the rivets 123 and 125 project. The attachment portion 133 is separated from the lever portion 131 by a cut 143 which, as shown in FIG. 8, is generally in the shape of an inverted channel. The hinge line between the attachment portion 133 and the lever portion 131 extends between the ends of the cut 143 and lies forwardly of the rivets 123 and 125. Use of two rivets 123 and 125 prevents pivoting of the tabe 127 about an axis generally perpendicular to the container wall 101 and also serves to stiffen a section 145 (FIGS. 9 and 10) of the can end to which the tab 127 is attached. As the tab 127 cannot pivot, it will apply substantially equal force to the wall segments 115 and 117.

Figure 9:
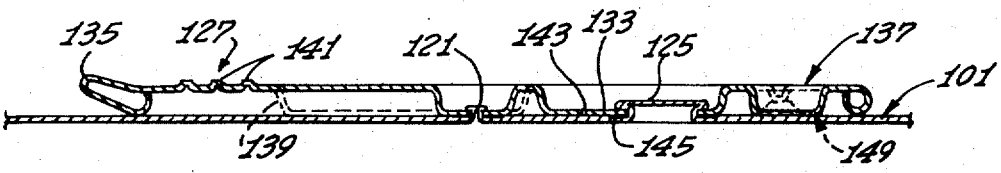
FIG. 9 is an enlarged fragmentary sectional view taken along line 9—9 of FIG. 8.
Figure 10:
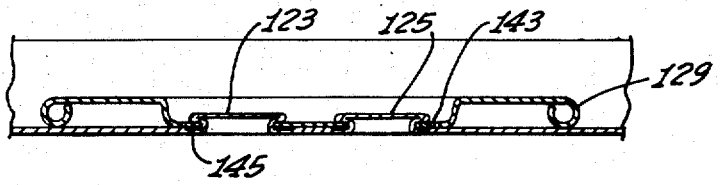
FIG. 10 is an enlarged fragmentary sectional view taken along line 10—10 of FIG. 8 and illustrating the tab and the two rivets utilized to connect the tab to the container wall.
Figure 11:
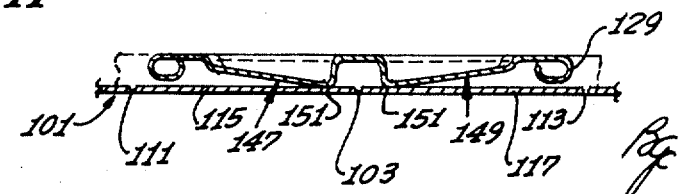
FIG. 11 is an enlarged fragmentary sectional view taken along line 11—11 of FIG. 8 and illustrating the pressure pads on the tab.

One of the features of this invention is the use of ramps or pressure pads 147 and 149 on the tab 127. The sheet metal of the tab 127 at the rupturing portion 137 is formed downwardly to form the pressure pads 147 and 149. As shown in FIGS. 9 and 11, the pressure pads 147 and 149 are inclined downwardly toward the can end 101 as they extend inwardly toward the score line 103 and the inner ends 151 thereof lie below the bead 129 and form the lowermost regions of the rupturing portion 137. The inner ends 151 are engageable with the wall segments 115 and 117 closely adjacent the rupturable score line 103. As shown in FIGS. 8 and 9, the pressure pads 147 and 149 lie intermediate the nose end or extremity of the rupturing portion of the tab and the hinge line that joins the attachment portion 133 to the lever portion 131.

The pressure pads 147 and 149 perform several important functions. First, when the tab 127 is pivoted, they place a force on the rupturable score lines which is substantially a pure shearing force. Secondly, they assure that such force is applied at the most effective point, i.e. adjacent the point of intersection 109. Third, because the distance between the pressure pads 147 and 145 and the hinge line is less than the distance between the hinge line and the nose end of the tab 127, they increase the mechanical advantage of the tab over that which would exist if the nose end of the tab were to contact the wall segments for the purpose of rupturing the score lines. Once the score line 103, 105, and 107 have been ruptured, the pressure pads 147 and 149 tend to effectively bend the wall segments 115 and 117 inwardly and to apply such bending force at a point which is substantially remote from the bend lines 111 and 113. The pressure pads 147 and 149 may be shaped to effectively cam the wall segments 115 and 117 inwardly. Except for the differences specifically shown in the drawings or described above, the embodiment of FIGS. 7–11 is identical to the first described embodiment.

Figure 12:
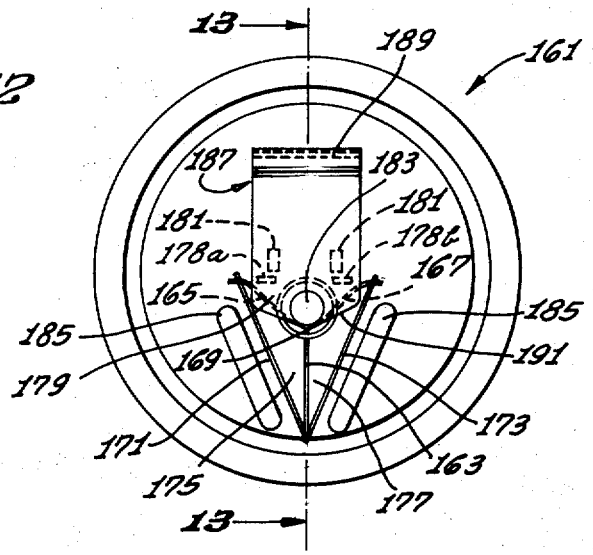
FIG. 12 is a plan view of a container wall illustrating a third embodiment of the present invention.
Figure 13:
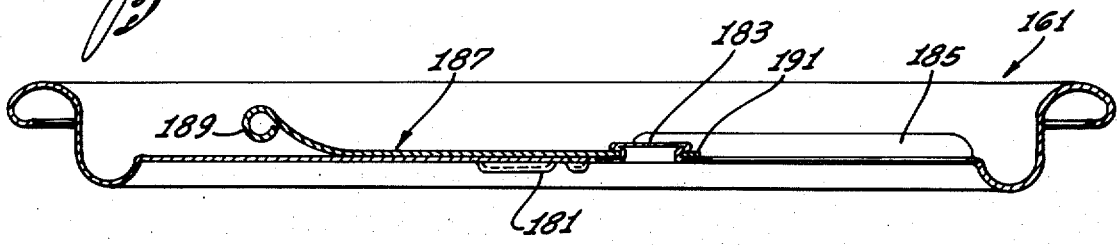
FIG. 13 is an enlarged sectional view taken along line 13—13 of FIG. 12.
Figure 14:
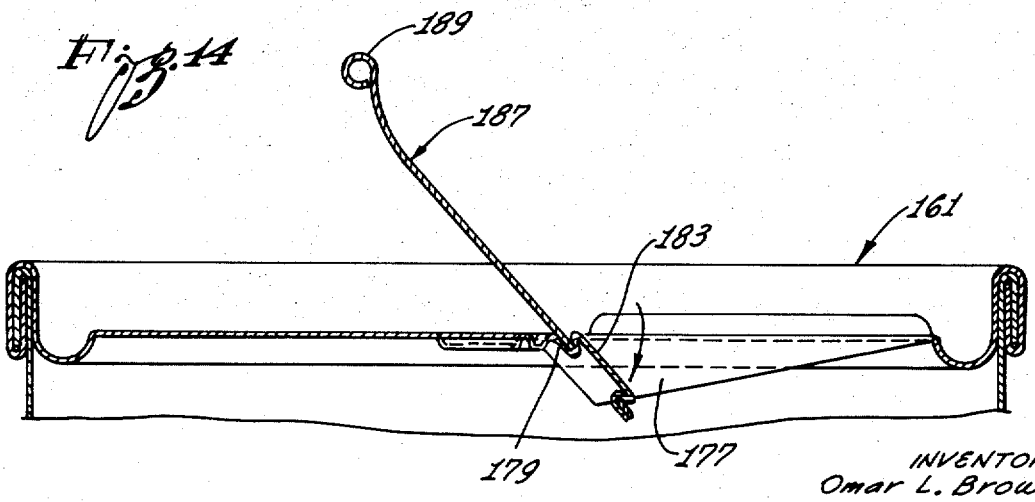
FIG. 14 is an enlarged sectional view similar to FIG. 13 with the tab raised to form an opening in the can end.

FIGS. 12–14 illustrate a third embodiment of the invention which is identical to the first embodiment except the tab construction and the shape of the wall segments have been changed. Specifically, FIGS. 12–14 illustrate a container wall 161 having rupturable score lines 163, 165 and 167 intersecting at a point of intersection 169 and extending generally radially outwardly therefrom. Two bend lines 171 and 173 interconnect the ends of the rupturable score lines to form wall segments 175 and 177 which are of triangular configuration and identical to each other.

The score lines 165 and 167 are not aligned as in the above described embodiments, but rather intersect to form an angle to thereby elongate the wall segments. The score lines 165 and 167 together with two short, aligned bend line segments 178a and 178b define a tongue 179 of the container wall which protrudes from the bend line segments 178a and 178b toward the point of intersection 169. The area of the can end outside the tongue 179 and adjacent the bend line segments 178a and 178b is stiffened by two downwardly formed ribs 181 positioned on opposite sides of a hollow rivet 183 which is formed integrally with the tongue 179 of the container wall. Ribs 185 may be formed along the bend lines 171 and 173, respectively, to take up the excess metal produced during the formation of the bend lines.

In this embodiment of the invention, a sheet metal tab 187 is secured to the container wall 161 by the rivet 183. The forward end of the tab is turned under and raised slightly above the container wall as shown in FIG. 13 to form a lifting end 189. A rupturing portion or end 191 overlies the wide end portions of the wall segments 175 and 179. The rupturing portion 191 tapers as it extends forwardly and preferably extends for substantially the complete distance between the bend lines 171 and 173. The tab 187 is entirely longitudinally rigid and has an attachment portion which includes an aperture for receiving the rivet 183; however, the attachment portion is rigidly integral with the remainder of the tab.

The operation of this form of the invention is the same as that described above in connection with FIGS. 1–11 except that the tab is longitudinally rigid, and therefore, the tongue 179 must bend inwardly as shown in FIG. 14 to allow pivotal movement of the tab. The tongue 179 bend inwardly along the bend line segments 178a and 178b to allow the rupturing portion 179 to cam or urge the wall segments 175 and 177 inwardly about their respective bend lines. The bend line segments assure that inward bending of the tongue will occur therealong rather than in random fashion along the can end.

Although exemplary embodiments of the invention have been shown and described, many changes, modifications, and substitutions may be made by one having ordinary skill in the art without necessarily departing from the spirit and scope of this invention.

I claim:

1. In an easy-opening container, the combination of:
a container wall of sheet material;
a rupturable score line in said container wall partially enclosing an area of said container wall, said container wall having a bend line extending between spaced points on said rupturable score line, said rupturable score line and said bend line at least substantially enclosing an area of said container wall to define a wall region bendable inwardly about said bend line;
a tab having a handle portion adjacent one end thereof and a rupturing portion;
means for *fixedly* securing said tab intermediate said portions thereof to said container wall with said rupturing portion thereof overlying at least a portion of said wall region and adapted to rupture said rupturable score line and bend said wall region inwardly about said bend line to form an opening in said container wall upon movement of said handle portion away from said container wall; and
means for allowing said handle portion of said tab to be moved back toward said container wall while maintaining said wall region bent inwardy to retain said opening in said container wall.

2. In an easy-opening container, the combination of:
a container wall of sheet material;
a rupturable score line in said container wall partially enclosing an area of said container wall, said container wall having a bend line therein, said rupturable score line and said bend line at least substantially enclosing an area of said container wall to define a wall region;
a tab having a lifting portion adjacent one end thereof and a rupturing portion;
means for *fixedly* securing said tab to said container wall outside of said wall region for pivotal movement relative to said container wall; and
said rupturing portion overlying at least a portion of said wall region and adapted to forcibly engage said wall region upon movement of said lifting portion away from said container wall *to bend the wall* region inwardly about said bend line to rupture said rupturable score line and form an opening in said container wall, said rupturing portion being disconnected from said wall region whereby said handle portion of said tab can be moved back toward said container wall without closing said opening with said wall segment.

3. A combination as defined in claim 2 wherein said tab extends across said rupturable score line and overlies only a portion of said wall region.

4. A combination as defined in claim 3 wherein said wall region is generally triangular.

5. In a container wall constructed of sheet material, the combination of:
first, second and third rupturable score lines in said container wall extending generally outwardly from a point on said container wall, each of said rupturable score lines terminating in an outer end;
a first line of bending extending between spaced locations on said first and second rupturable score lines adjacent the outer ends thereof;
a second line of bending extending between locations on said second and third rupturable score lines adjacent the outer ends thereof, said first and second rupturable score lines and said first line of bending defining a first wall segment and said second and third rupturable score lines and said second line of bending defining a second wall segment;
a tab having a lifting portion adjacent one end thereof and a rupturing portion; and
means for securing said tab to said container wall outside of said wall segments with said rupturing portion being forcibly engageable with said wall segments upon movement of said lifting portion of said tab away from said container to bend the wall segments inwardly about said first and second bend lines, respectively, to rupture said first, second and third score lines and form an opening in said container wall whereby said handle portion of said tab can be moved back toward said container wall without closing said opening with said wall segments.

6. A combination as defined in claim 5 wherein said rupturing portion of said tab is engageable with said container wall approximately at said point.

7. A combination as defined in claim 5 wherein said rupturing portion of said tab overlies only a portion of said wall segments and includes surface means engageable with said wall segments closely adjacent said second rupturable score line before the rupture thereof and during the inward bending of said wall segments to thereby facilitate such inward bending.

8. A combination as defined in claim 5 wherein said tab is secured to said container wall closely adjacent said point and overhangs said first and third rupturable score lines.

9. A combination as defined in claim 8 wherein each of said wall segments is substantially triangular in plan and said tab overhangs only a portion of said wall segments thereby leaving substantial portions of said wall segments uncovered by said tab.

10. In an easy-opening container, the combination of:

a container wall of sheet material;

a first rupturable score line defining a first rupturable web and at least partially enclosing a first area of said container wall;

a first line of weakness in said container wall defining a first bendable web, said first bendable web and said first rupturable web defining a first wall segment of said container wall;

a second rupturable score line defining a second rupturable web and at least partially enclosing a second area of said container wall, said second rupturable web including at least a portion of the length of said first rupturable web;

a second line of weakness in said container wall defining a second bendable web, said second bendable web and said second rupturable web defining a second wall segment of said container wall adjacent said first wall segment;

a tab having a handle portion adjacent one end thereof and a rupturing portion; and means for securing said tab to said container wall outside of said wall segments with said rupturing portion overlying at least a portion of both of said wall segments and crossing said portion of the length of said first rupturable web, said rupturing portion being forcibly engageable with said wall segments to bend the latter inwardly about said first and second bend lines, respectively, to rupture said rupturable score lines and form an opening in said container wall upon movement of said handle portion of said tab away from said container wall, whereby said handle portion of said tab can be moved back toward said container wall without closing said opening with said wall segments.

11. A combination as defined in claim 10 wherein each of said wall segments is elongated, said bendable webs extend generally longitudinally of their respective wall segments, and said rupturing portion of said tab overlies only an end portion of each of said wall segments.

12. In an easy-opening container, the combination of:

a container wall of sheet material;

a line of weakness in said container wall partially enclosing an area of said container wall, said container wall having a bend line therein, said line of weakness and said bend line at least substantially enclosing an area of said container wall to define an inwardly bendable wall region;

a tab having a lever portion and an attachment portion joined by hinge portion which allows pivotal movement of said lever portion relative to said attachment portion, said lever portion having a lifting portion and a rupturing portion adjacent the ends thereof; and

*rivet* means for securing said tab to said *container* wall outside of said wall region and closely adjacent said wall region with said rupturing portion overlying at least a portion of said wall region, said lever portion being pivotable about said hinge portion to cause said rupturing portion to forcibly engage said wall region to rupture said line of weakness and bend said wall region inwardly about said bend line to form an opening in said container wall.

13. A combination as defined in claim 12 wherein said tab is constructed of sheet metal and said hinge portion includes a pliable portion of the sheet metal of said tab extending generally transversely of said tab to define a transverse hinge line and said transverse hinge line lies substantially along at least a portion of said line of weakness.

14. A combination as defined in claim 12 wherein said hinge portion overlies said container wall outside of said wall region.

15. A combination as defined in claim 12 wherein said *rivet* means [for securing said tab to said container wall] includes a pair of rivets integral with said container wall and projecting through apertures of said attachment portion of said tab to thereby prevent said tab from pivoting about an axis generally perpendicular to said container wall and to stiffen the region of the container wall to which said tab is attached.

16. A combination as defined in claim 12 wherein said rupturing portion terminates in a nose end and said rupturing portion of the tab includes at least one pressure pad extending downwardly toward said wall region and forcibly engageable therewith upon pivotal movement of said lever portion of said tab, said one pressure pad lying intermediate said hinge portion and said nose end.

17. An easy-opening container, the combination of:

a container wall of sheet material;

first and second bendable webs in said container wall, said webs intersecting to form an angle, each of said bendable webs having an outer end remote from the apex of said angle;

score line means in said container wall defining first, second and third rupturable webs extending respectively from points adjacent the outer ends of said bendable webs and the apex of said angle toward the interior of said angle and intersecting substantially at a point, said bendable webs and said rupturable webs defining first and second wall segments;

a tab having a lever portion and an attachment portion joined by a pliable portion defining a hinge line, said lever portion having a lifting end and a rupturing portion; and means for securing said attachment portion to said container wall outside of said wall segment adjacent the portion of the score line means which interconnects the outer ends of said first and second bendable webs, said rupturing portion overhanging a portion of said wall segments and said lifting end of said tab being remote from said wall segments, said hinge line lying within an area between said lifting end of said tab and a region of the container wall closely adjacent said portion of said score line means.

18. A combination as defined in claim 17 wherein said portion of said score line means is a substantially straight line and each of said wall segments is generally in the form of a right triangle, said wall segments are of substantially the same size and shape and said hinge line lies substantially along said portion of said score line means.

19. A combination as defined in claim 17 wherein said rupturing portion of said tab terminates in a nose end and said tab includes first and second pressure pads overlying said first and second wall segments, respectively, with each of said pressure pads projecting downwardly toward its respective wall segment and being forcibly engageable therewith upon pivoted movement of said lever portion about said hinge line, said pressure pads lying intermediate said hinge line and said nose end.

20. A tab constructed of sheet material for use with an easy-opening container wall having at least one inwardly bendable wall region comprising:

a lever portion and an attachment portion joined by a transversely extending hinge portion to thereby allow said lever portion to pivot relative to said attachment portion, said lever portion having a lifting end and a rupturing portion on opposite sides of said hinge portion with distance between said rupturing portion and said hinge portion being less than the distance between said lifting end and said rupturing portion, said rupturing portion terminating in a nose end;

the sheet material of a peripheral region of the tab being bent inwardly to define a reinforcing bead along at least a portion of the periphery of the tab to strengthen said lever portion; and a portion of the sheet material of said tab intermediate said nose end and said hinge portion being formed downwardly to define a pressure pad forcibly engageable with said wall region inwardly of said nose end as the latter engages the wall region to force the same inwardly upon lifting of the handle portion of the tab whereby the mechanical advantage of the tab is increased.

21. A combination as defined in claim 20 wherein the tab is adapted for opening said wall region when said wall region includes two wall segments, said tab including a second pressure pad spaced transversely from the first mentioned pressure pad, each of said pressure pads being engageable with one of the wall segments.

22. A combination as defined in claim 21 wherein each of said pressure pads tapers downwardly as it extends toward the other of the pressure pads.

*23. In an easy-opening container, the combination of:*

*a container wall of sheet material;*

*a rupturable score line in said container wall partially enclosiing an area of said container wall, said container wall having a bend line therein, said rupturable score line and said bend line at least substantially enclosing an area of said container wall to define a wall region;*

*a tab having a lifting portion adjacent one end thereof and a rupturing portion;*

*means for fixedly securing said tab to said container wall outside of said wall region for pivotal movement relative to said container wall;*

*said rupturing portion overlying a portion of said wall region and adapted to forcibly engage said wall region upon movement of said lifting portion away from said container wall to bend the wall region inwardly about said bend line to rupture said rupturable score line and form an opening in said container wall; and*

*said tab overlying only a portion of said wall region prior to movement of said lifting portion away from said container wall.*

*24. An easy-opening container wall comprising:*

*a container wall of sheet material;*

*a first rupturable score line defining a first rupturable web and at least partially enclosing a first area of said container wall;*

*a first line of weakness in said container wall defining a first bendable web, said first bendable web and said first rupturable web defining a first wall segment of said container wall;*

*a second rupturable score line defining a second rupturable web and at least partially enclosing a second area of said container wall, said second rupturable web including at least a portion of the length of said first rupturable web;*

*a second line of weakness in said container wall defining a second bendable web, said second bendable web and said second rupturable web defining a second wall segment of said container wall adjacent said first wall segment;*

*a tab having a handle portion adjacent one end thereof and a rupturing portion; and*

*means for securing said tab to said container wall outside of said wall segments with said rupturing portion overlying at least a portion of both of said wall segments and extending across said portion of the length of said first rupturable web, said rupturing portion being forcibly engageable with said wall segments to bend the latter inwardly about said first and second bend lines, respectively, to rupture said rupturable score lines and form an opening in said container wall upon movement of said handle portion of said tab away from said container wall.*

*25. An easy-opening container wall as defined in claim 24 wherein each of said wall segments is generally triangular.*

*26. An easy-opening container wall comprising:*

*a container wall of sheet material;*

*first and second bendable webs in said container wall, said webs substantially intersecting to form an angle, each of said bendable webs having an outer end remote from the apex of said angle;*

*a line of weakness in said container wall defining first, second and third rupturable webs extending respectively from points adjacent the outer ends of said bendable webs and the apex of said angle toward the interior of said angle and intersecting substantially at a first location, said bendable webs and said rupturable webs defining first and second wall segments;*

*a tab having a lever portion and an attachment portion joined by a pliable portion defining a hinge line, said lever portion having a lifting end and a rupturing portion; and*

*means for attaching said attachment portion to said container wall outside of said wall segment with said rupturing portion overlying a portion of said wall segments, said hinge line lying within an area between said lifting end of said tab and a region of the container wall closely adjacent said portion of said score line means.*

*27. An easy-opening container wall comprising:*

*a container wall of sheet material;*

*a line of weakness in said container wall defining first and second contiguous wall segments, said wall segments being bendable inwardly of the container wall along first and second lines, respectively;*

*a tab having a nose and a handle portion; and*

*means for attaching the tab to the container wall outside of the wall segments with the nose of the tab overlying at least a portion of both of the wall segments whereby movement of the handle portion forces the nose of the tab against the wall segments to rupture the sheet material along at least a portion of the line of weakness and to bend the first and second wall segments inwardly about the first and second lines, respectively.*

*28. An easy opening container wall comprising:*

*a container wall of sheet material;*

*a line of weakness in said container wall defining a wall segment, the sheet material of said container wall being rupturable along said line of weakness to thereby permit said wall segment to be at least partially removed from the container wall to form an opening in the container wall;*

*a tab having a lever section and an attachment section, said lever section having a nose and a handle portion*

*with said nose and handle portion being spaced along said lever section;*

*means for fixedly attaching the tab at said attachment section thereof to the container wall outside of the wall segment with the nose of the tab overlying at least a portion of the wall segment; and*

*means for facilitating pivotal movement of said lever section relative to said attachment section whereby movement of the handle portion forces the nose of the tab against the wall segment to rupture the sheet material along at least a portion of the line of weakness to thereby form the opening in the container wall.*

References Cited

The following references, cited by the Examiner, are of record in the patented file of this patent or the original patent.

UNITED STATES PATENTS

| | | | |
|---|---|---|---|
| 3,338,460 | 8/1967 | Cookson | 220—48 |
| 3,326,406 | 6/1967 | Brown | 220—54 |
| 3,366,270 | 1/1968 | Khoury | 220—54 |

GEORGE T. HALL, Primary Examiner

U.S. Cl. X.R.

220—27